United States Patent [19]
Patterson et al.

[11] Patent Number: 6,122,741
[45] Date of Patent: Sep. 19, 2000

[54] DISTRIBUTED METHOD OF AND SYSTEM FOR MAINTAINING APPLICATION PROGRAM SECURITY

[76] Inventors: David M. Patterson, 2401 Ohio Dr. #1204, Plano, Tex. 75093; Eugene E. Williams, 9669 Forest La. #201, Dallas, Tex. 75243

[21] Appl. No.: 08/934,092

[22] Filed: Sep. 19, 1997

[51] Int. Cl.[7] ................................................ H04L 9/00
[52] U.S. Cl. ................................... 713/200; 707/9
[58] Field of Search .................... 713/200, 201, 713/202; 707/9; 709/229; 380/23, 25

[56] References Cited

U.S. PATENT DOCUMENTS

| | | | |
|---|---|---|---|
| 5,077,795 | 12/1991 | Rourke et al. ............................ | 380/55 |
| 5,127,099 | 6/1992 | Zifferer et al. ........................ | 395/725 |
| 5,276,901 | 1/1994 | Howell et al. .......................... | 395/800 |
| 5,315,657 | 5/1994 | Abadi et al. ............................ | 380/25 |
| 5,423,034 | 6/1995 | Cohen-Levy et al. ................... | 395/600 |
| 5,448,731 | 9/1995 | Wang et al. ............................. | 395/650 |
| 5,675,782 | 10/1997 | Montague et al. ...................... | 395/609 |
| 5,678,041 | 10/1997 | Baker et al. ............................ | 395/609 |
| 5,729,734 | 3/1998 | Parker et al. ........................... | 395/609 |
| 5,778,365 | 7/1998 | Nishiyama ............................... | 707/9 |
| 5,819,091 | 10/1998 | Arendt et al. .......................... | 395/685 |
| 5,881,225 | 3/1999 | Worth ...................................... | 395/186 |
| 5,941,947 | 8/1999 | Brown et al. ........................... | 709/225 |

*Primary Examiner*—Robert W. Beausoliel, Jr.
*Assistant Examiner*—Scott T. Baderman

[57] ABSTRACT

A method of and system for managing access by a plurality of users to a plurality of application programs by maintaining a security database accessible by each of said application programs. In response to an attempted access to one of the application programs by one of the users, the application queries the security database for access information for the user. In response to the query, the security database returns access information to said the application program. The application program limits use of the application program by the user according to the access information returned from the security database.

18 Claims, 12 Drawing Sheets

DISTRIBUTED METHOD OF AND SYSTEM FOR MAINTAINING APPLICATION PROGRAM SECURITY

FIELD OF THE INVENTION

The present invention relates generally to computer application program security, and more particularly to a method and system for maintaining and enforcing application program security in a distributed environment.

DESCRIPTION OF THE PRIOR ART

It is important for most enterprises to have control over who creates, maintains, deletes, and modifies data that is critical to the business objectives of the enterprise. Many enterprises maintain their data in a distributed or client server environment in which potentially many users can access applications and data from any of several networked personal computers or terminals. Maintaining access control for many users for many applications is a major problem.

Different applications have different levels of security, depending upon the confidentiality and criticality of data used by the application or the criticality of the function performed by the application. For example, some low criticality application may be walked up to and used by anyone. Other applications require an enrollment of a user, and then subsequent authenticated logon in order to perform application functions. Still other applications require an enrollment, authenticated logon, and administrated access privileges for particular users.

Currently, security is application specific. Each application manages its own security. Typically, access to a network is controlled by user logon. However, after a user obtains access to a network, the applications that the user accesses or attempts to access control their own security.

Managing control of access by users, and groups of users, is a very difficult task with little consistency. It is therefore an object of the present invention to provide a single system to control user access to many types of applications in a distributed environment.

SUMMARY OF THE PRIOR ART

The present invention provides a method of and system for managing access by a plurality of users to a plurality of application programs by maintaining a security database accessible by each of the application programs. In response to an attempted access to one of the application programs by one of the users, the application queries the security database for access information for the user. In response to the query, the security database returns access information to the application program. The application program limits use of the application program by the user according to the access information returned from the security database.

The security database maintains for each application program a list of rights and for each user a list of assigned rights selected from the list of rights for each application program. The access information returned by the security database includes the list of assigned rights for the user attempting to access the application program. The application program limits user access by limiting functionality according to the list of rights returned from the security database. For example, the application program may disable user interface features and controls according to the list of rights.

The present invention allows a security administrator to maintain the security database graphically. In response to a logon by a security administrator, a list of users is displayed. The security administrator can invoke the display of a list of application programs available to a selected user. The security administrator can further invoke the display of a list of rights assigned to a selected user for a selected application and a list of rights available for said the selected application program and unassigned to said selected user.

The security administrator can manage the rights assigned to a particular user by graphically moving rights back and forth between the lists of assigned and unassigned rights. Additionally, the security administrator can define templates for selected application programs. A template comprises a selected subset of rights for a selected application program. The security administrator can assign a template to a user or a defined group of users.

DESCRIPTION OF THE PREFERRED EMBODIMENT

Figure 1:
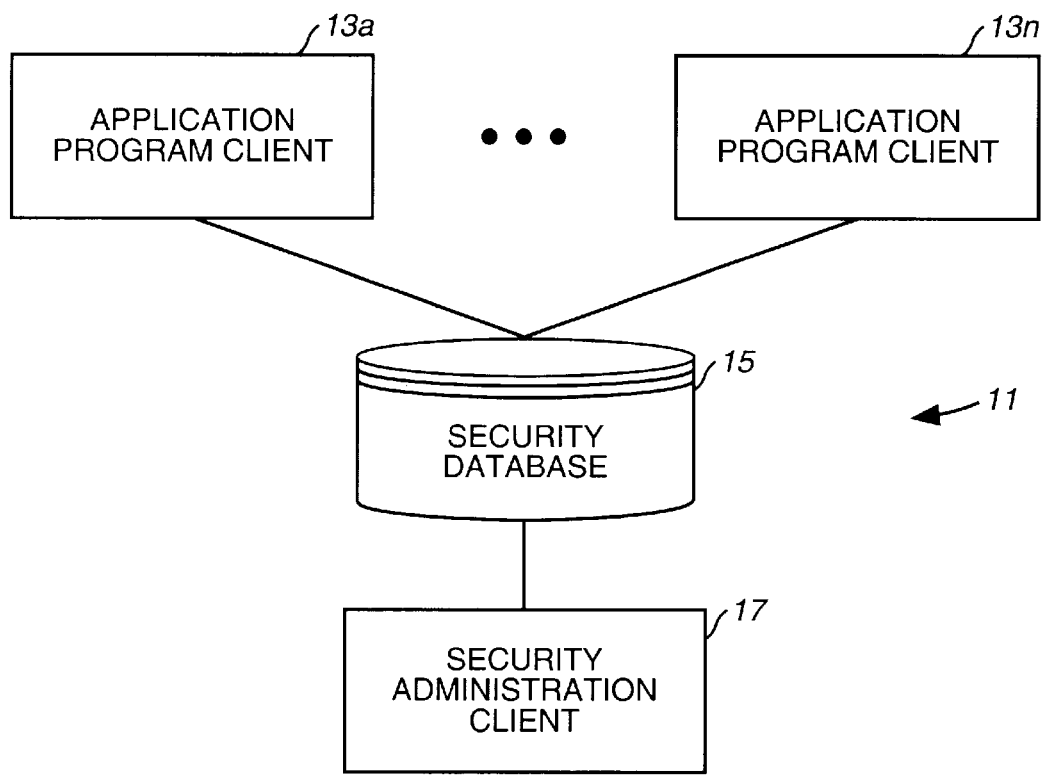
FIG. 1 is a block diagram of system according to the present invention.

Referring now to the drawings, and first to FIG. 1, a system according to the present invention is designated generally by the numeral 11. System 11 includes a plurality of application program clients 13, a security database 15, an at least one security administration client 17. System 11 is depicted at the application level. Accordingly, application program clients 13 and security administration client 17 may be running on any of several different machines in a network environment.

The present invention defines a security architecture and system for all applications, including application program clients 13 and security administration client 17, used by a large number of users. Users, or groups of users, are assigned rights to the many applications that can be accessed. User information, group information, and access privilege information is appropriately stored in security database 15. As will be explained in detail hereinafter, data in security database 15 is managed with a single graphical interface of security administration client 17. Application program clients 13 query security database 15 for users privileges or rights in order to identify whether and to what extent a user may use a specific application program client 13.

In the preferred embodiment, security database 15 comprises six structured query language (SQL) tables that are appropriately accessed with joins. The SQL tables include user information, group information, templates, user system, system privileges, and groups tables. The user information table includes user rows, each containing user name, password, user ID, and other user information. The group information table comprises group rows, each containing group ID, group name, date and time when the group was created, and the user ID of the person who manages the group. The templates table comprises template rows, each containing template name, system name, and privilege ID. As will be explained in detail hereinafter, a template generally is a preselected set of access rights that may be assigned to a user or group of users. The user system table comprises user system rows for mapping privileges to the users, each containing user or group ID, system name, and privilege ID. The system privilege table comprises system privilege rows, each containing system name, privilege ID, and privilege description. Finally, the group table includes group mapping rows, each containing group ID and user ID. A user can belong to more than one group.

The join fields include user ID, group ID, and system name privilege ID. The user ID field joins the user information, group information, user system, and groups tables. Group ID joins the group information, user system, and groups tables. The system name privilege ID field joins the user system, and system privileges tables. In the preferred embodiment, user ID and group ID fields are unique system generated handles to facilitate joins, and they are different from the user name that is used to identify a user.

Figure 2:
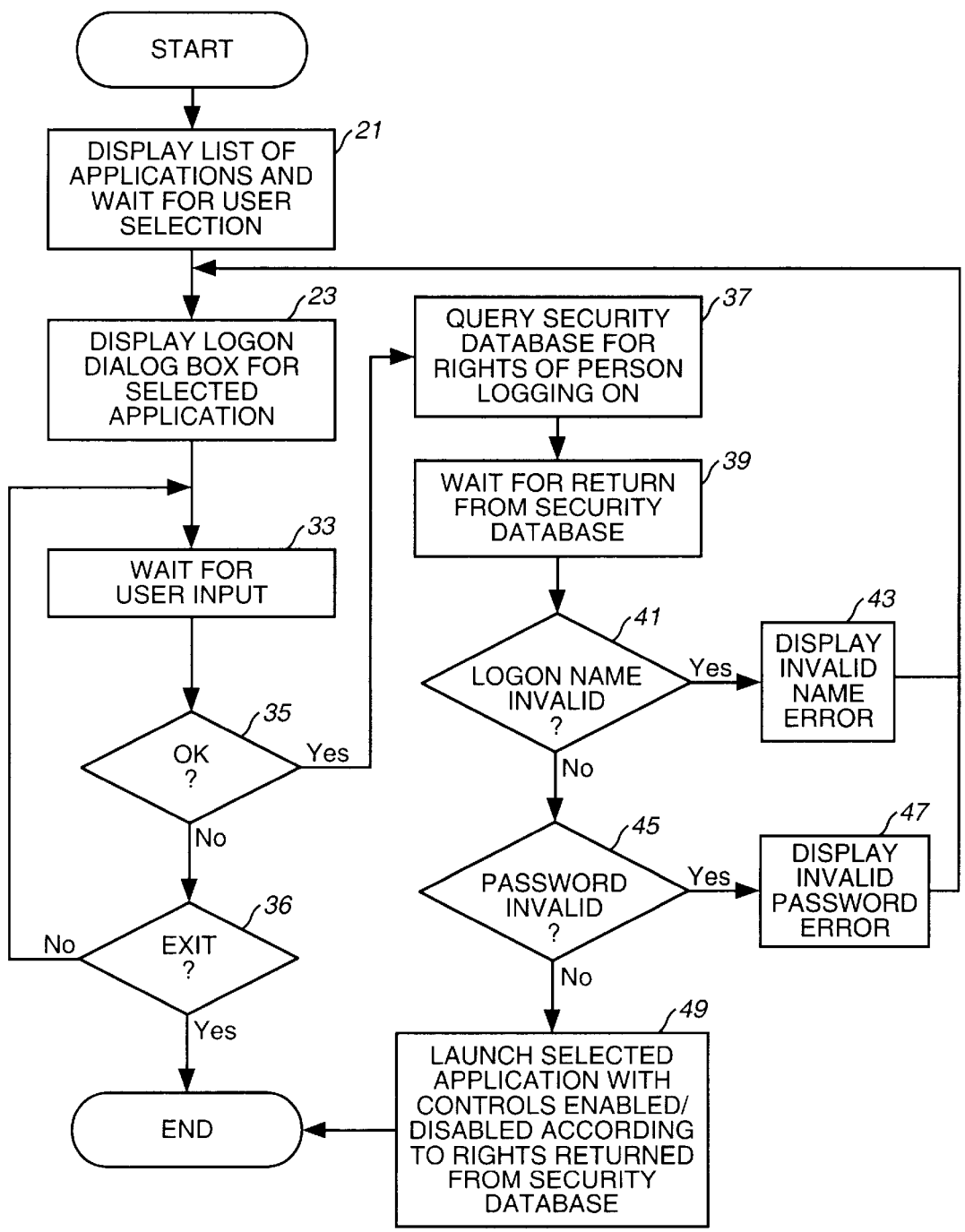
FIG. 2 is a flowchart of a logon sequence according to the present invention.
Figure 3:
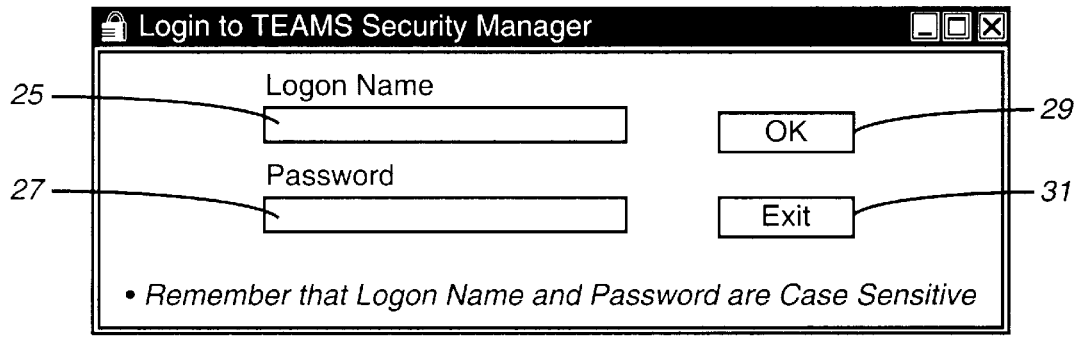
FIG. 3 is a pictorial view of a logon dialog box for a security administration client according to the present invention.

Referring now to FIG. 2, there is shown a flow chart of an application logon and launch sequence according to the present invention. Initially, each workstation or terminal in the network displays a list of applications and waits for user selection, as indicated at block 21. When a user selects an application, the client workstation displays a logon dialogue box for the selected application, at block 23. An example of an application logon dialogue box for the security administration client is shown in FIG. 3. The logon dialogue box includes a logon name text entry field 25 and a password text entry field 27. The application logon dialogue box of FIG. 3 also includes an OK push button 29 and an EXIT push button 31.

Referring again to FIG. 2, after the client workstation has displayed the logon dialogue box for the selected application at block 23, the system waits, at block 33, for user input in the form of clicking on either the OK push button 29 or the EXIT push button 31 of FIG. 3. If, at decision block 35, the user clicks on the OK push button, the client workstation queries the security database for the rights of the person logging on, at block 37. If, at decision block 36, the user clicks on the EXIT button, the application logon and launch sequence ends.

The security database searches for the user name and password. If the user name and password are valid, the security database returns a list of rights assigned to the user for the selected application. If the logon name or password is invalid, the security database returns an invalid logon name or invalid password.

The client workstation waits, at block 39 for the return from the security database. If, at decision block 41, the security database has returned an invalid logon name, the client workstation displays an invalid name error at block 43 and returns to block 23 to display the logon dialogue box for the selected application. If, at decision box 45, the return is an invalid password, the client workstation displays an invalid password error at block 47 and returns to block 23. If the logon name and password are valid, then the security database returns the list of rights assigned to the user for the selected application and the system launches the selected application with controls enabled and disabled according to rights returned from the security database, at block 49. Preferably, the application program clients are implemented with a graphical user interface. Thus, the present invention limits access to application features by enabling and disabling user interface controls.

Figure 4:
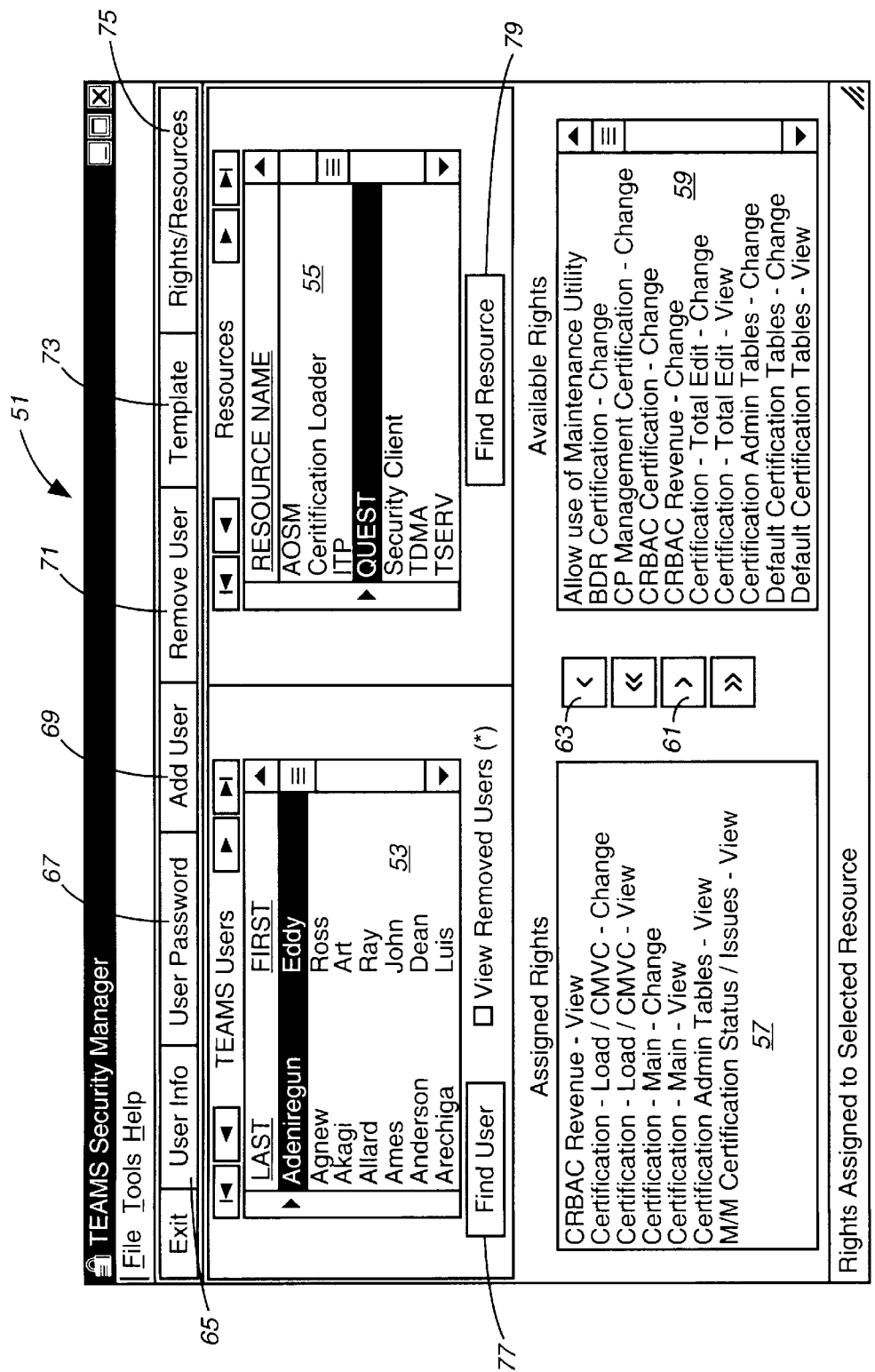
FIG. 4 is a pictorial view of a main menu screen for the security administration client of the present invention.

Referring now to FIG. 4, the security administration client main window is designated generally by the numeral 51. The security administration client enables a security administrator, with the appropriate access level, to administer the security database. According to the present invention, security for the security administration client is administered in the same way that security for application program clients is administered. Thus, when a user attempts to logon to the security administration client using the logon dialogue box of FIG. 3, the system performs FIG. 2 processing and the security database returns a list of the rights that the user has with respect to the security administration client. Generally, the system-provides three levels of access to security data through the client administration data. Those rights are browse only, administrate users, and administrate everything. The present invention enables and disables controls and features in the security administration client according to the rights returned form the security database.

Main window 51 includes a scrollable list 53 of system users. Upon selection of a user from list 53, as indicated by highlighting, a list of resources with respect to which the selected user has been granted rights is displayed at 55. Resources include application program clients and the security administration client. Upon selection of a particular resource from list 55, as indicated by highlighting, the system displays a list of rights assigned to the selected user for the selected resource, at 57, and a list of available rights for the selected resource that have not been assigned to the selected user, at 59. With the appropriate level of access, a security administrator can move rights back and forth between list 57 and 59. A security administrator can delete an assigned right by selecting the right from list 57. If the security administrator has authority to change rights assignment as determined by the list of rights returned from the security database when the security client was launched, a transfer button 61 is enabled. By clicking on transfer button 61, the selected rights from list 57 are moved to list 59 and the security database is updated to reflect the change. Similarly, if the security administrator selects a right or rights from available rights list 59, a transfer button 63 is enabled. Whenever rights are transferred between lists 57 and 59, the security database is updated appropriately.

Main window 51 includes a number of graphical controls and pulldowns. A toolbar includes, in addition to an exit button, a user info button 65, a user password button 67, an add user button 69, a remove user button 71, a template button 73, and a rights/resources button 75. The details of the actions performed with the toolbar buttons will be discussed in detail hereinafter. In addition to the toolbar buttons, there is a find user button 77 and a find resources button 79. Clicking on find user button 77 prompts the security administrator to enter a string to perform a fast path to a user in list 53. Similarly, clicking on find resource button 79 prompts the security administrator to enter a string to perform a fast path to a resource without scrolling.

Figure 5:
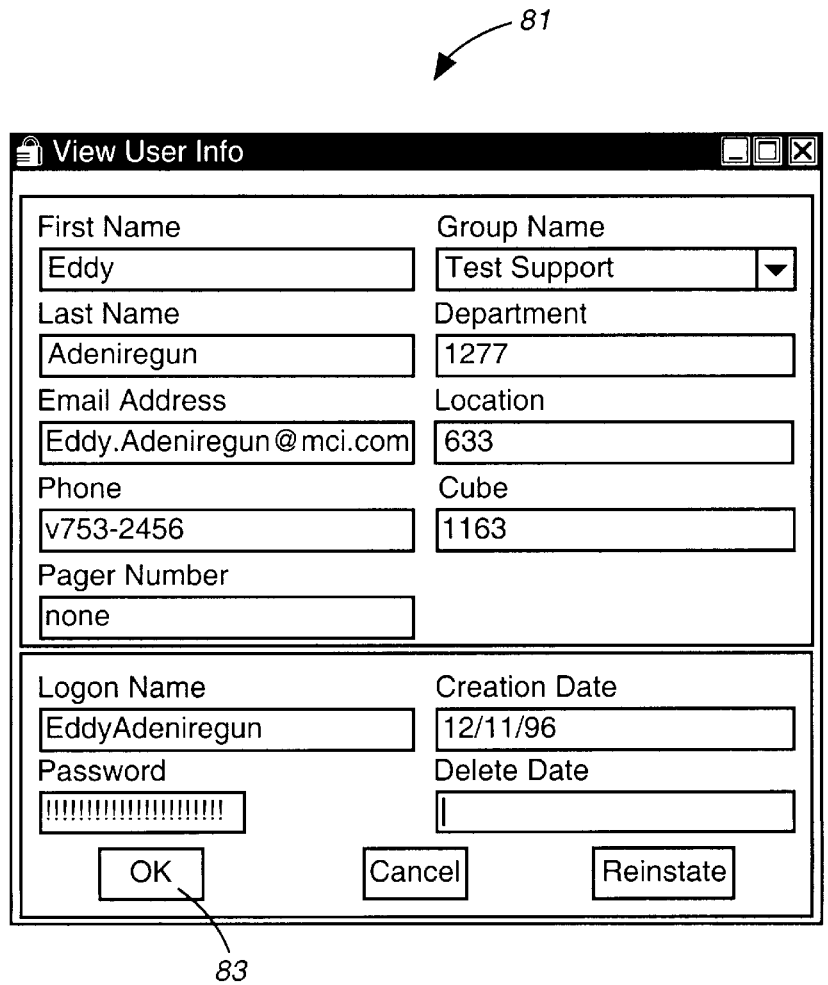
FIG. 5 is a pictorial view of a user information dialog box for the security administration client of the present invention.

Clicking on user info button 65 opens a view user info dialogue box designated generally by the numeral 81 in FIG. 5. As shown in FIG. 5, view user info dialogue box 81 includes text fields that contain user information. With the appropriate level of access, a security administration client user can change information in view user info dialogue box 81. After information in dialogue box 81 has been changed, clicking on OK button 83 will cause the security database to be updated with the changed information. Referring again to FIG. 4, clicking on add user push button 69 will display a user info dialogue box 81 with blank text entry fields. A security administrator with the appropriate level of access can add a user to security database by entering information into the appropriate text fields.

Figure 6:
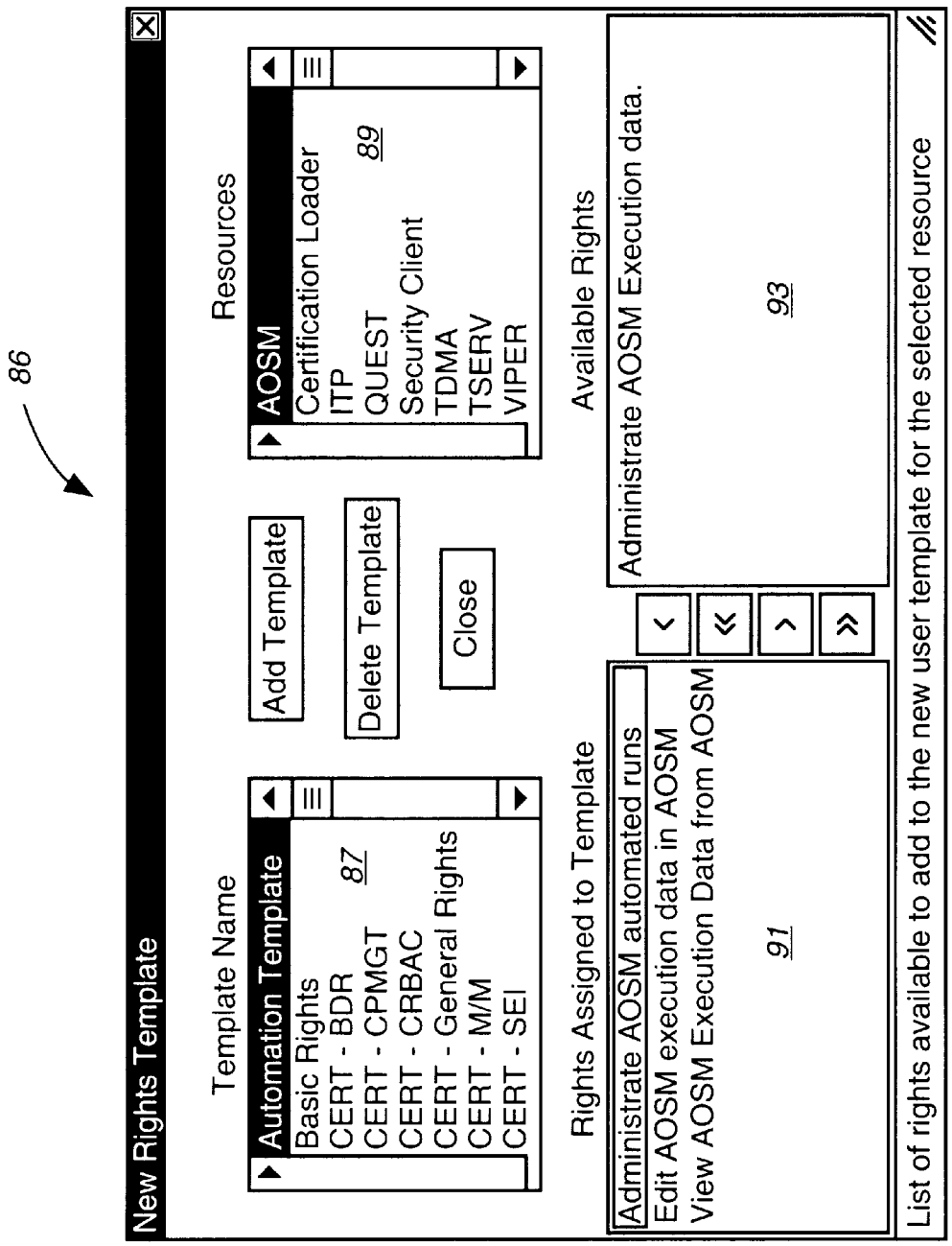
FIG. 6 is a pictorial view of a new rights template screen for the security administration client of the present invention.

The present invention allows a security administrator, with the appropriate level of access to define rights templates. A template is a predefined set of rights for a resource. With templates, a security administrator can assign the predefined set of rights to a user or group of users without having to assign the rights individually. Clicking on template button 73 of main window 51 displays a new rights template window 85, as shown in FIG. 6. New rights template window 85 includes a list 87 of template names and a list 89 of resources. The rights assigned to the template are listed at 91 and the available but unassigned rights are listed at 93. With the appropriate level of authority, transfer controls are enabled to allow a security administrator to transfer rights back and forth between lists 91 and 93. Templates are stored in the security database. As will be discussed in detail hereinafter, templates can be assigned to users or groups of users.

Figure 7:
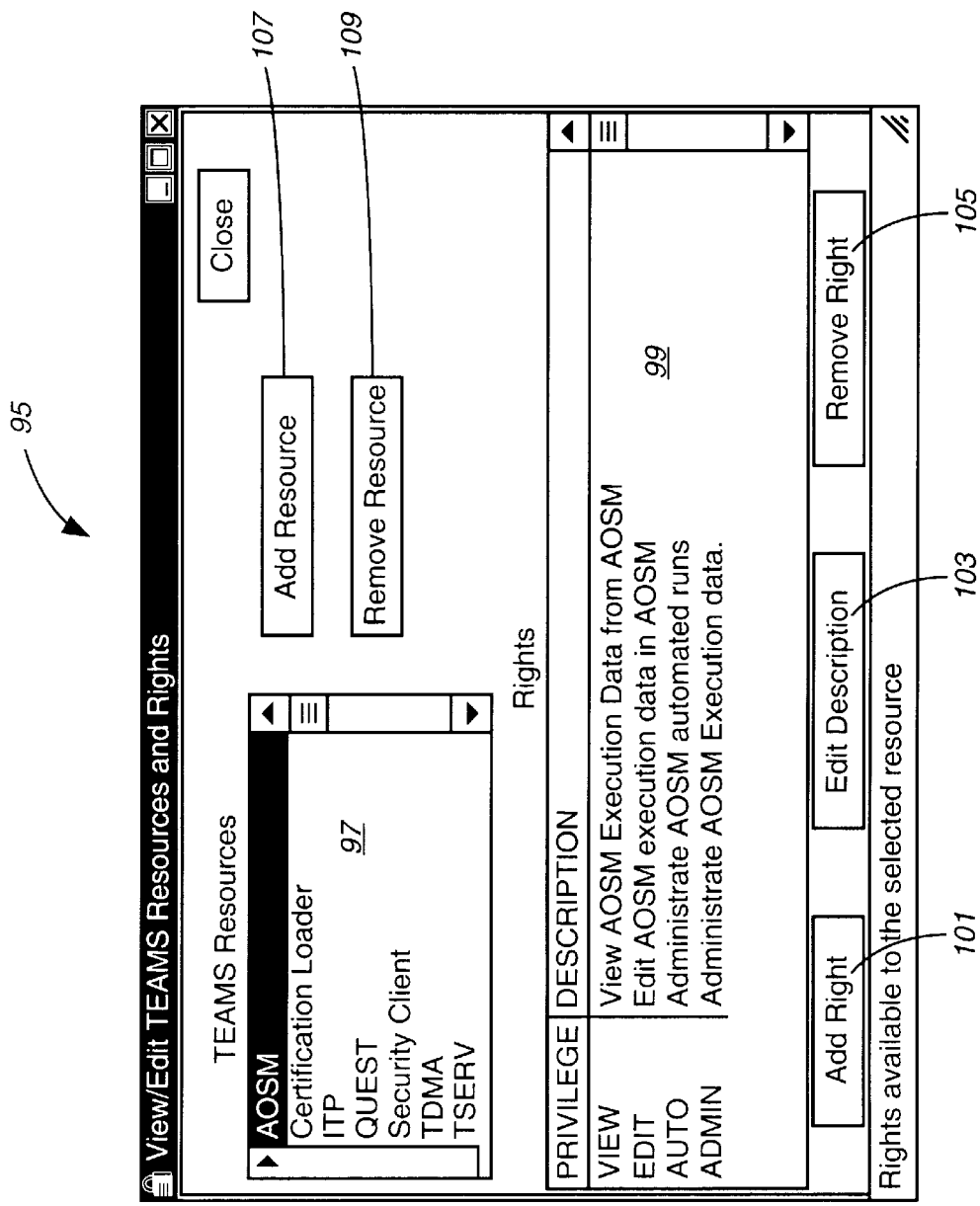
FIG. 7 is a pictorial view of a view/edit resources and rights screen for the security administration client of the present invention.

Resources and rights are managed through a rights and resources window shown in FIG. 7 and designated generally by the numeral 95. Rights and resources window 95 is opened by clicking on rights resources button 75 of FIG. 4. The resources and the rights therein are maintained through window 95. The resources in the system are displayed in a resources list 97. Selecting a resource, as indicated by highlighting, displays a list of rights defined for the selected application in a rights list 99. Rights list 99 includes a privilege column that contains the name of the right, and a description column that contains a description of the right. With the appropriate access level, a security administrator can add a right for the selected resource by clicking on an add right button 101. Clicking on button 101 displays a dialogue box that prompts the security administrator to enter the name and the description of the added right. A system administrator, with the appropriate level of access, can also edit a description of a right by clicking on edit description button 103 or remove a selected right by clicking on remove right button 105. The security database is updated to reflect any change in the rights displayed in list 99.

A security administrator, with the appropriate level of access, can also add a resource by clicking on add resource button 107, which prompts the security administrator to enter the new resource and rights associated with the resource. Finally, a system administrator, with the appropriate level of access can delete a selected resource by clicking on remove resource button 109. All changes effected through window 95 are entered into the security database.

Figure 8:
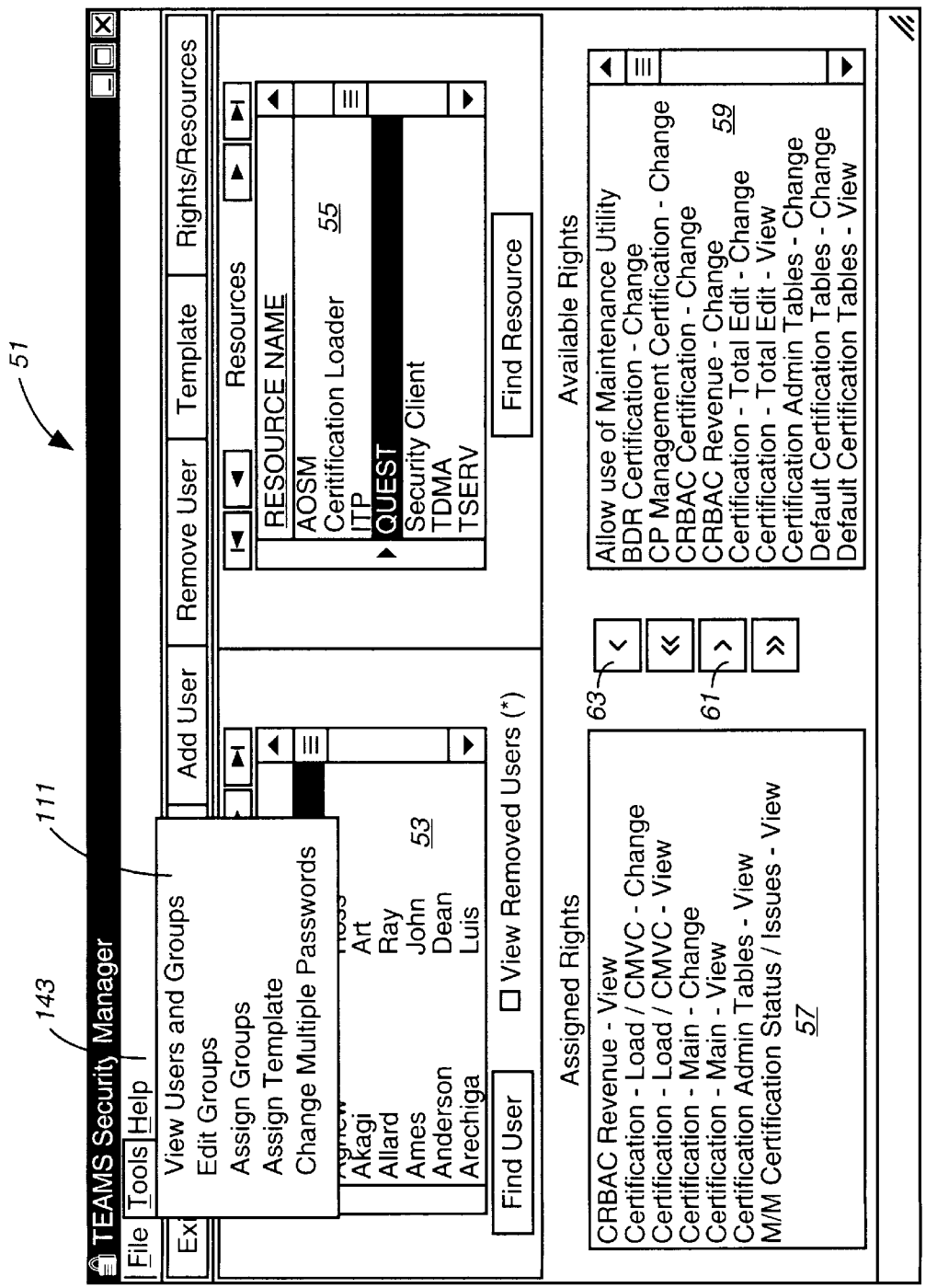
FIG. 8 is a pictorial view of a tools pulldown menu for the security administration client of the present invention.

As shown in FIG. 8, certain actions in the security administration client are accessed by way of a tools pulldown menu 111 invoked from an action bar 113. Tools menu 111 has several menu choices including view users and groups, edit groups, assign groups, assign template, and change multiple password.

Figure 9:
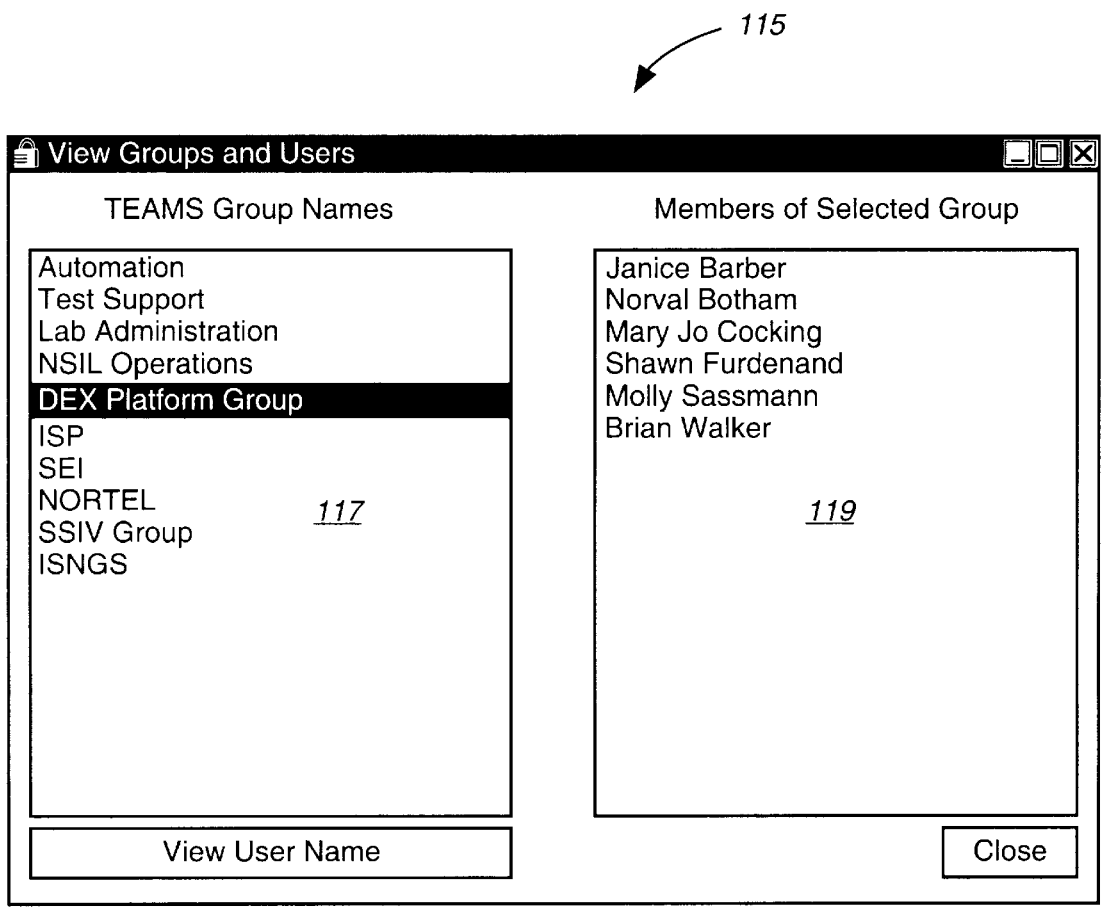
FIG. 9 is a pictorial view of a view groups and users screen for the security administration client of the present invention.

Referring to FIG. 9, a view groups and users window, designated generally by the numeral 115 is displayed. Window 115 is invoked by selection of the view users and groups menu choice from tools pulldown menu 111. Predefined group names are displayed in a list 117. The selection of a group name from list 117 displays a list of members of the selected group in a list 119. Rights or templates can be assigned to a named group, which in turn assigns the rights or templates to the members of the group.

Figure 10:
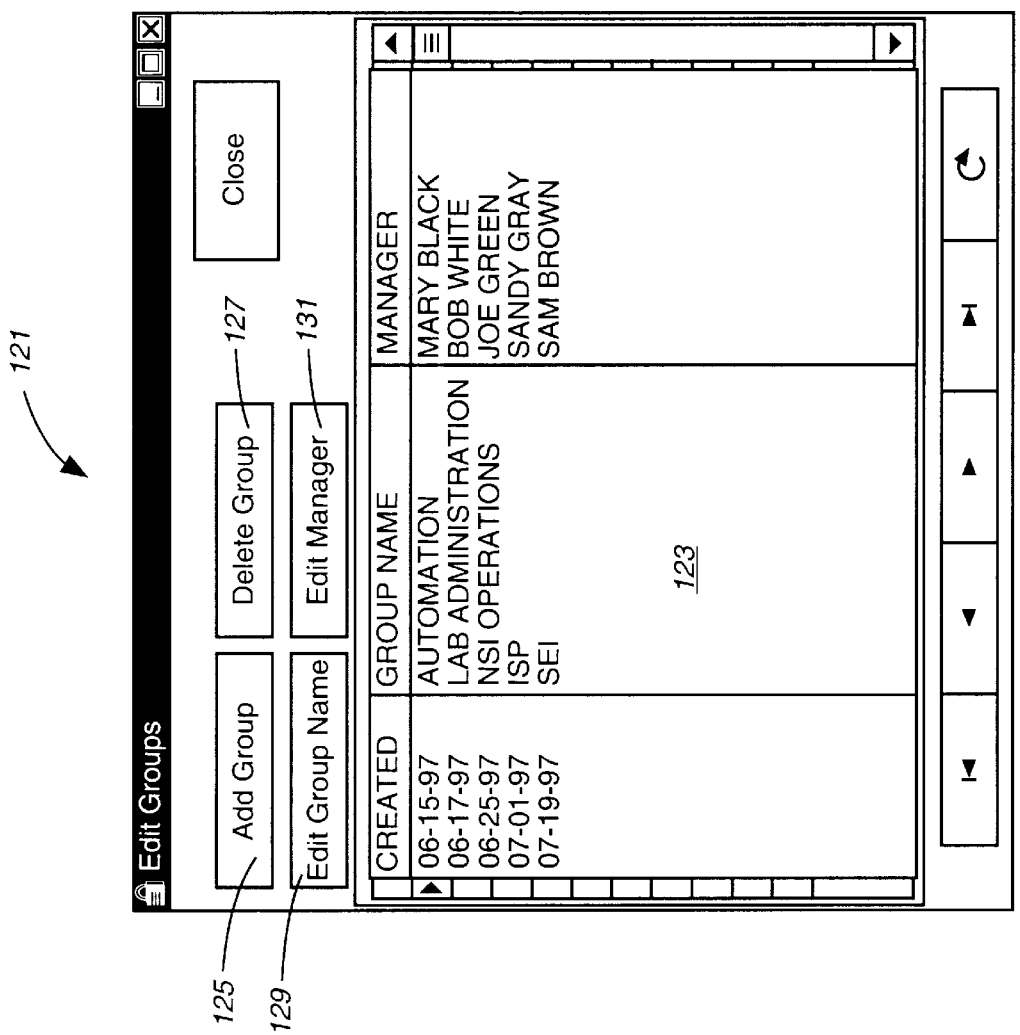
FIG. 10 is a pictorial view of an edit groups screen for the security administration client of the present invention.

As shown in FIG. 10, groups can be edited through an edit groups window, designated generally by the numeral 121. Window 121 is opened by selecting the edit groups menu choice from tools menu 111 of FIG. 8. The group name, group manager, and date the group was created, are displayed in a list 123. Groups can be added by clicking on an add group button 125, which opens a dialogue box that prompts the security administrator to enter the group name and manager. A selected group can be deleted by clicking on a delete group button 127. A selected group name or manager can be edited by clicking on an edit group name button 129 or an edit manager button 131. The security database is updated with any changes entered through edit groups window 121.

Figure 11:
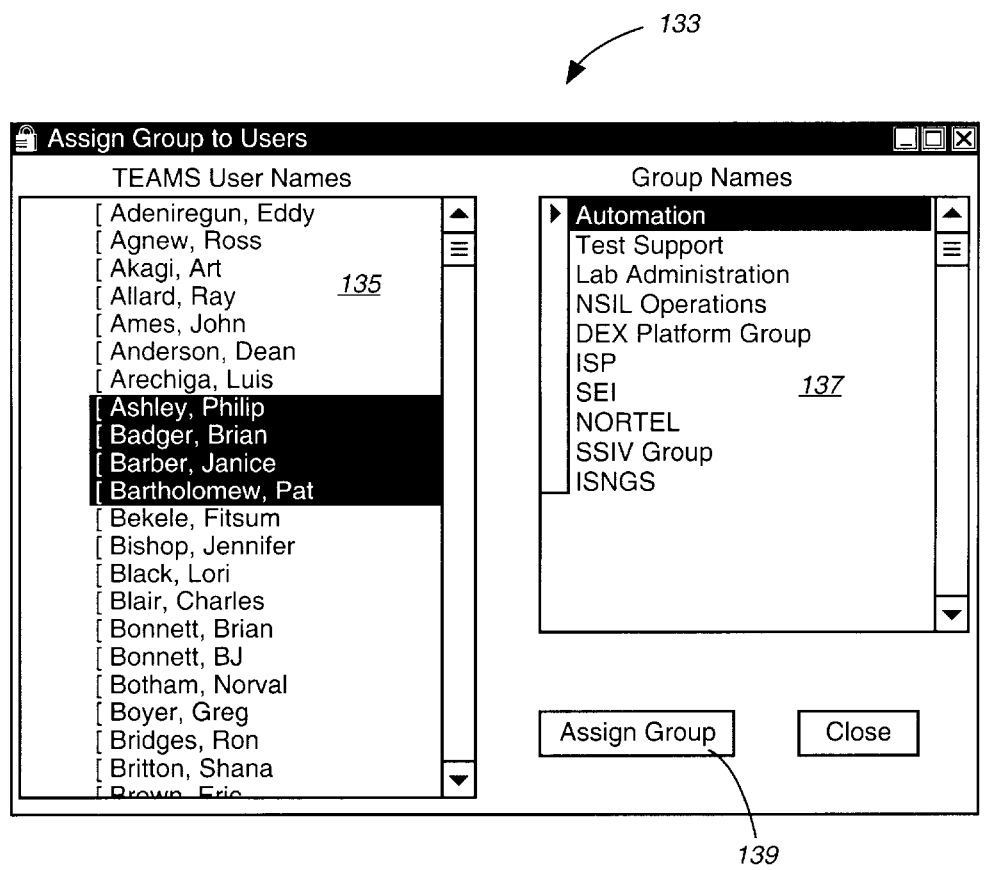
FIG. 11 is a pictorial view of an assign group to users screen for the security administration client of the present invention.

Referring now to FIG. 11, users can be assigned to groups through an assigned groups to users window, which is designated generally by the numeral 133. Window 133 includes a scrollable list of user names 135 and a scroll able list of group names 137. Selected users, as indicated by highlighting, can be assigned to a selected group by clicking on an assign group button 139. Group assignments affected through window 133 are entered into the security database.

Figure 12:
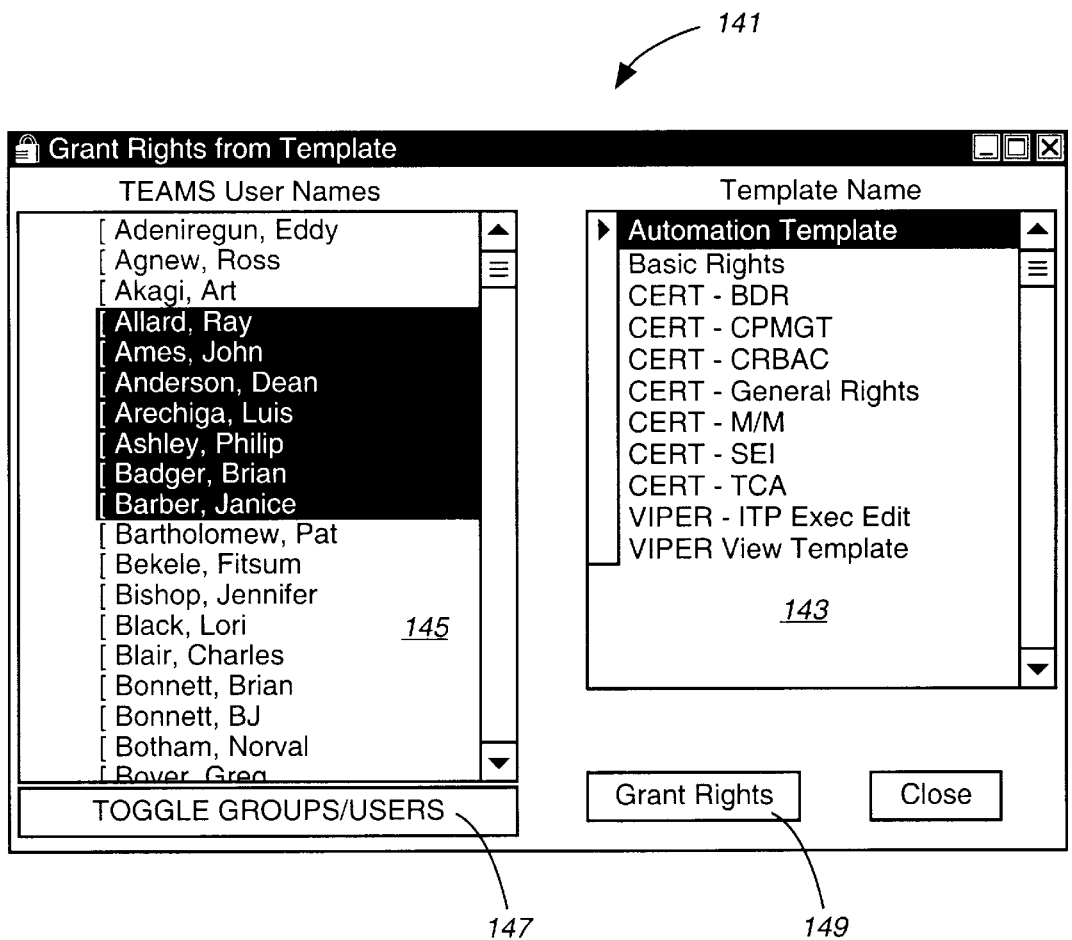
FIG. 12 is a pictorial view of a grant rights from template screen for the security administration client of the present invention.

Referring now to FIG. 12, rights can be granted from templates with a grant-rights from template window designated generally by the numeral 141. Window 141 includes a list 143 of template names, and a list 145 of user names. A toggle groups/users button 147 is provided to enable a security administrator to toggle between list 145 of user names and a list of groups (not shown). A selected rights template from list 143 can be granted to selected users from list 145 by clicking on a grants rights button 149.

Figure 13:
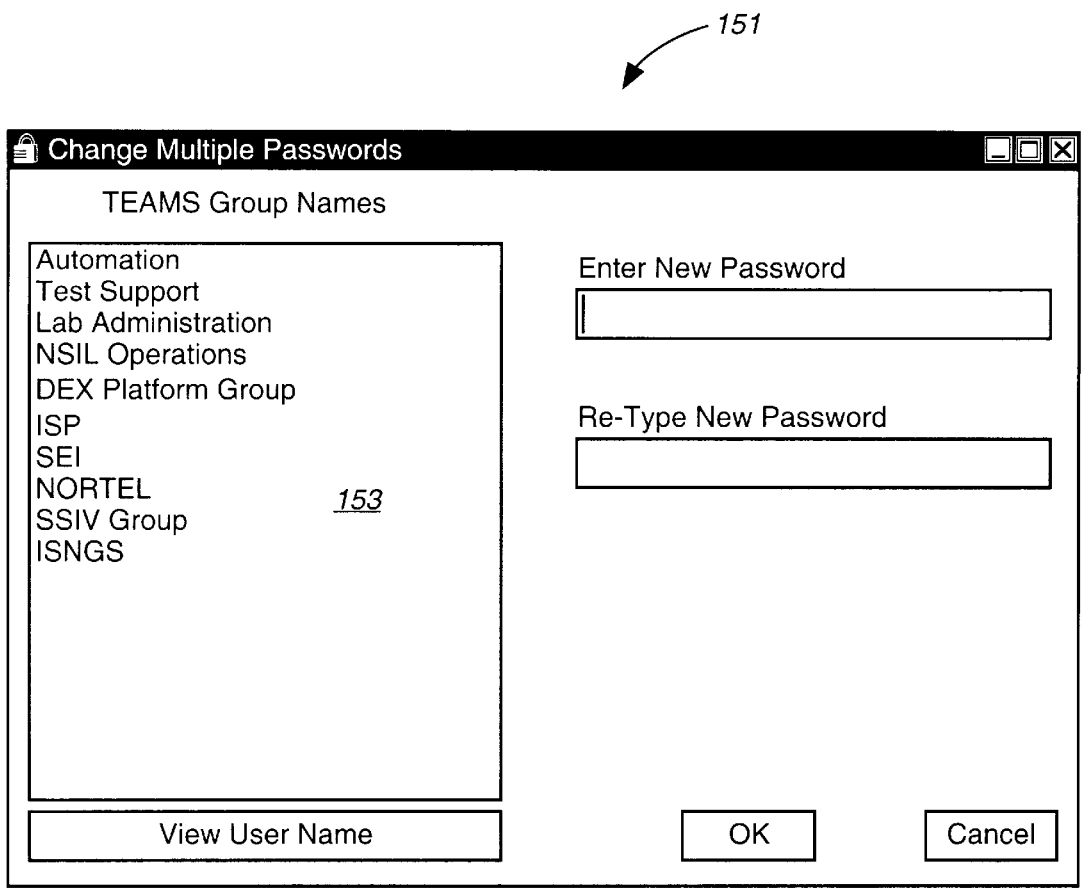
FIG. 13 is a pictorial view of a change multiple passwords screen for the security administration client of the present invention.

Referring now to FIG. 13, a change multiple passwords window is designated generally by the numeral 151. Window 151 is accessed by selecting change multiple passwords menu choice from tools pulldown menu 111 of FIG. 8. Window 151 allows a security administrator, with appropriate level of access, to assign new passwords to groups. Window 151 includes a list 153 of group names. The security administrator can change the password for a selected group by entering a new password into a text entry field. After, the group password has been set, individual members of the group can set individual passwords.

From the foregoing, it may be seen that the present invention overcomes the shortcomings of the prior art. The present invention provides a single security system interface for maintaining access control for a variety of applications. Access rights for all applications in the system are maintained in a single database. The applications query the database for access rights. The applications enforce the access rights by enabling their user interface only to the extent allowed by the access rights returned from the security database.

What is claimed is:

1. A method of managing access by a plurality of users to a plurality of application programs, which comprises the computer implemented steps of:

maintaining a security database accessible by each of said application programs, comprising the step of displaying to a security administrator a list of users in response to a logon by the security administrator;

in response to a logon to one of said application programs by one of said users, querying said security database for access information for said one user;

in response to selection of a displayed user, displaying a list of application programs available to the selected user;

in response to selection of a displayed application program, displaying a list of rights assigned to said selected user for the selected application;

in response to a query, returning access information to said one application program;

limiting use of said one application program by said one user according to access information returned from said security database; and in response to selection of a displayed application program, displaying a list of rights available for said selected application program and unassigned to said selected user.

2. The method as claimed in claim 1, wherein said step of limiting use of said one application program by said one user includes the computer implemented step of limiting functionality of said one application program according to access information returned from said security database.

3. The method as claimed in claim 2, wherein said step of limiting functionality of said one application program includes the computer implemented step of disabling user interface features according to access information returned from said security database.

4. The method as claimed in claim 1, wherein said security database maintains for each application program a list of rights.

5. The method as claimed in claim 4, wherein said step of maintaining access information includes the computer implemented step of maintaining for each user a list of assigned rights selected from the list of rights for each application program.

6. The method as claimed in claim 5, wherein said step of returning access information includes the computer implemented step of returning the list of assigned rights for said one user for said one application program.

7. The method as claimed in claim 1, including the computer implemented steps of:

in response to selection of a right from said list of rights assigned to said selected user for the selected application:

deleting said selected right from said list of rights assigned to said selected user for the selected application; and, displaying said selected right in said list of rights available for said the selected application program and unassigned to said selected user.

8. The method as claimed in claim 1, including the computer implemented steps of:

in response to selection of a right from said list of rights available for said selected application program and unassigned to said selected user:

deleting said selected right from said list of rights available for said the selected application program and unassigned to said selected user; and, displaying said selected right in said list of rights assigned to said selected user for the selected application.

9. The method as claimed in claim 1, wherein said step of maintaining said security database includes the computer implemented step of:

defining for each application program a set of rights.

10. The method as claimed in claim 9, wherein said step of maintaining said security database includes the computer implemented step of:

assigning rights from said sets of rights to users.

11. The method as claimed in claim 9, wherein said step of maintaining said security database includes the computer implemented step of:

defining templates for selected application programs, each template comprising a subset of rights for a selected application program.

12. The method as claimed in claim 11, including the step of:

assigning a template to a user.

13. The method as claimed in claim 11, including the step of:

assigning a template to a predefined group of users.

14. A system, which comprises:

a security database;

a plurality of application program clients, each of said application program clients including means for accessing said security database, and each of said application program clients including means for limiting program use by a user according to information returned from said security database; and, at least one security administration client, said security administration client including means for maintaining said security database comprising means for displaying to said security administrator a list of users;

means for displaying a list of applications programs available to a selected user;

means for displaying a list of rights assigned to said selected user for a selected application; and means for displaying a list of rights available for said selected application program and unassigned to said selected user.

15. The system as claimed in claim 14, wherein said means limiting use by a user includes means for limiting functionality of said application program client according to said information returned from said security database.

16. The system as claimed in claim 15, wherein said means for limiting functionality of said application program client includes means for disabling user interface features according to said information returned from said security database.

17. The system as claimed in claim 14, including:

means, responsive to selection of a right from said list of rights assigned to said selected user for the selected application, for:

deleting said selected right from said list of rights assigned to said selected user for the selected application; and, displaying said selected right in said list of rights available for said the selected application program and unassigned to said selected user.

18. The system as claimed in claim 14, including:

means, responsive to selection of a right from said list of rights available for said selected application program and unassigned to said selected user, for:

deleting said selected right from said list of rights available for said the selected application program and unassigned to said selected user; and, displaying said selected right in said list of rights assigned to said selected user for the selected application.

\* \* \* \* \*